No. 761,925. PATENTED JUNE 7, 1904.
A. SMITH.
NAIL OR SPIKE.
APPLICATION FILED JULY 24, 1903.
NO MODEL.

Witnesses:
E. F. Wilson
John J. Snowhook

Inventor:
Andrew Smith
By Rudolph —
Attorney.

No. 761,925. Patented June 7, 1904.

UNITED STATES PATENT OFFICE.

ANDREW SMITH, OF TRAVERSE CITY, MICHIGAN, ASSIGNOR OF ONE-HALF TO DAN E. CARTER AND LUVERNE B. WOOD, OF TRAVERSE CITY, MICHIGAN.

NAIL OR SPIKE.

SPECIFICATION forming part of Letters Patent No. 761,925, dated June 7, 1904.

Application filed July 24, 1903. Serial No. 166,849. (No model.)

*To all whom it may concern:*

Be it known that I, ANDREW SMITH, a citizen of the United States, residing at Traverse City, in the county of Grand Traverse and State of Michigan, have invented certain new and useful Improvements in Nails or Spikes; and I do hereby declare the following to be a full, clear, and exact description of the invention, such as will enable others skilled in the art to which it appertains to make and use the same.

My invention relates to a novel construction in a nail or spike, the object being to provide a device of this character which will obtain a very firm hold on the wood or other material into which it is driven; and it consists in the features of construction hereinafter fully described and claimed.

Figure 1:
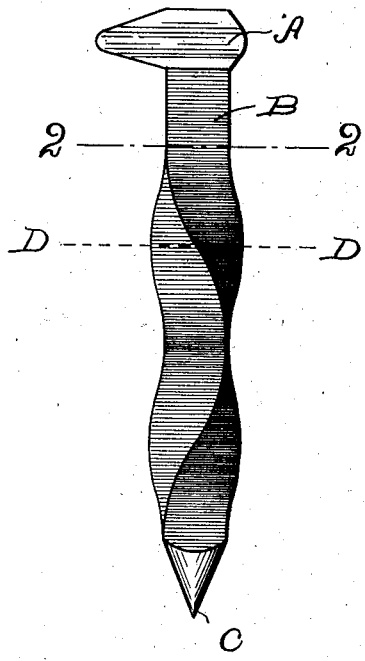
Figure 3:
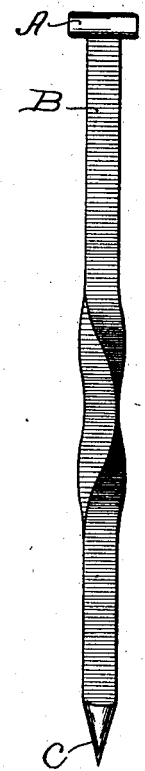
Figure 2:
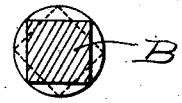

In the accompanying drawings, illustrating my invention, Figure 1 is a view in elevation of a railroad-spike constructed in accordance with my invention. Fig. 2 is a transverse section on the line 2 2 of Fig. 1. Fig. 3 is a view similar to Fig. 1, showing a nail constructed in accordance with my invention.

Referring now to said drawings, A indicates the head, B the shank, and C the point of a nail or spike made in accordance with my invention. The said shank B is preferably square in cross-section, while the point C thereof is conical. The said shank B is provided with a right and left twist between its ends, such twist being imparted by firmly holding the ends of the square portion of said shank and grasping the latter midway between its ends and giving it approximately a quarter-turn. Above said twisted portion said shank may be of any desired shape in cross-section. The effect produced by so twisting the shank is to cause the nail or spike when driven to make a partial turn in one direction and then in the opposite direction, giving it such a firm hold that it is almost impossible to withdraw it. It is particularly adapted for use on railroads, as it is not affected by vibration and will not work loose.

In Fig. 2 I have indicated in dotted lines a cross-section of the nail or spike if taken on the dotted line D D of Fig. 1.

I claim as my invention—

1. As a new article of manufacture, a nail or spike having a shank polygonal in cross-section and having a right and left twist between its ends.

2. As a new article of manufacture, a nail or spike having a shank polygonal in cross-section and having a right and left twist between its ends and a conical point.

3. As a new article of manufacture, a nail or spike having a square shank provided with a right and left twist between its ends.

4. As a new article of manufacture, a nail or spike having a square shank provided with a right and left twist between its ends, said twist extending through an arc of about ninety degrees.

5. As a new article of manufacture, a nail or spike having a square shank provided with a right and left twist between its ends, said twist extending through an arc of about ninety degrees, and a conical point on said nail or spike.

In testimony whereof I affix my signature in presence of two witnesses.

ANDREW SMITH.

Witnesses:
GEO. H. CROSS,
EUNICE ROSSER.